June 1, 1948.　　　　D. J. STEWART　　　　2,442,384
FIRE CONTROL COMPUTER HAVING NONUNIFORM
TARGET FLIGHT COMPENSATING MECHANISM
Filed March 17, 1943　　　　　　　　　　　13 Sheets-Sheet 1

INVENTOR
Duncan J. Stewart
By Parker, Carlson, Pitzner & Hubbard
ATTORNEYS

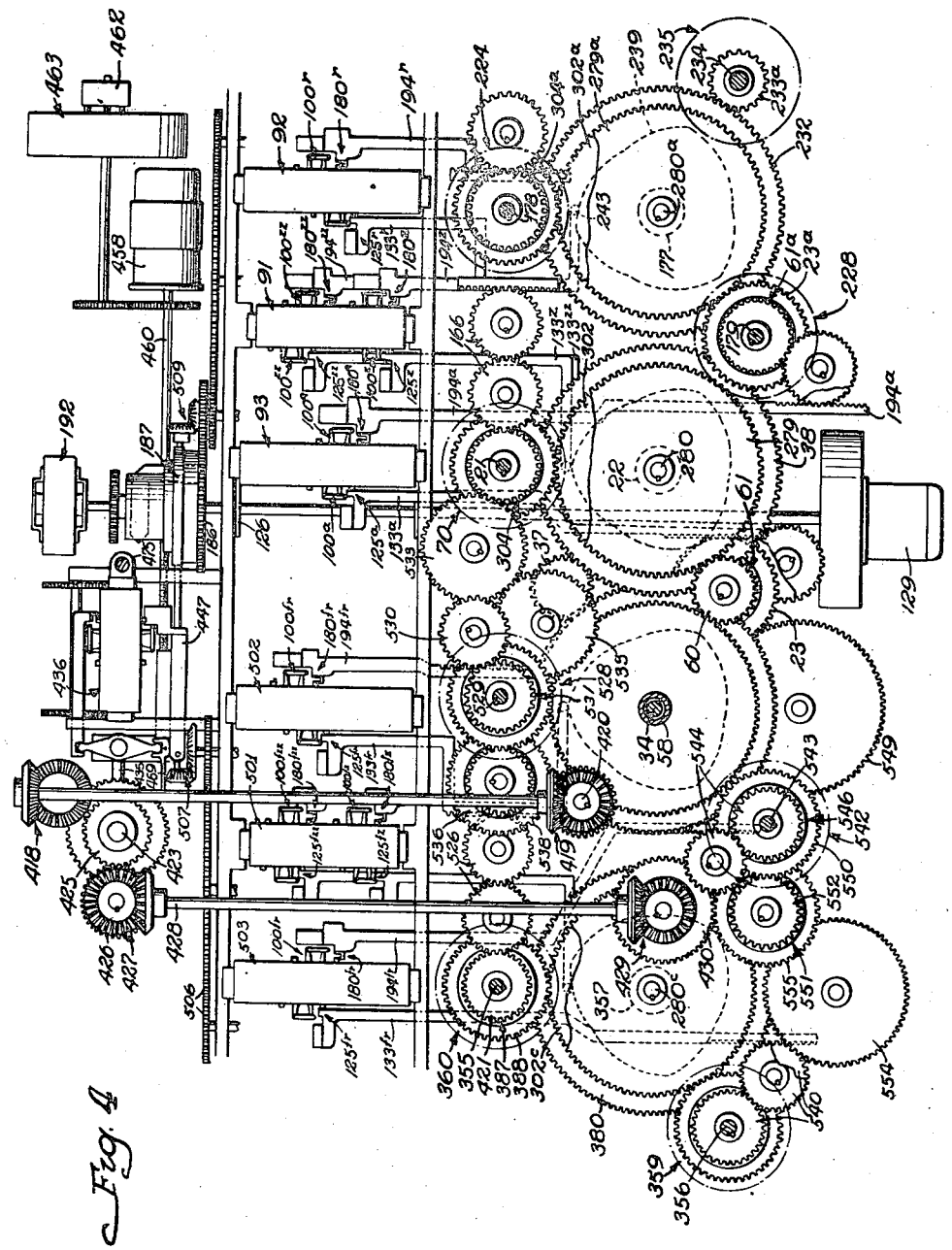

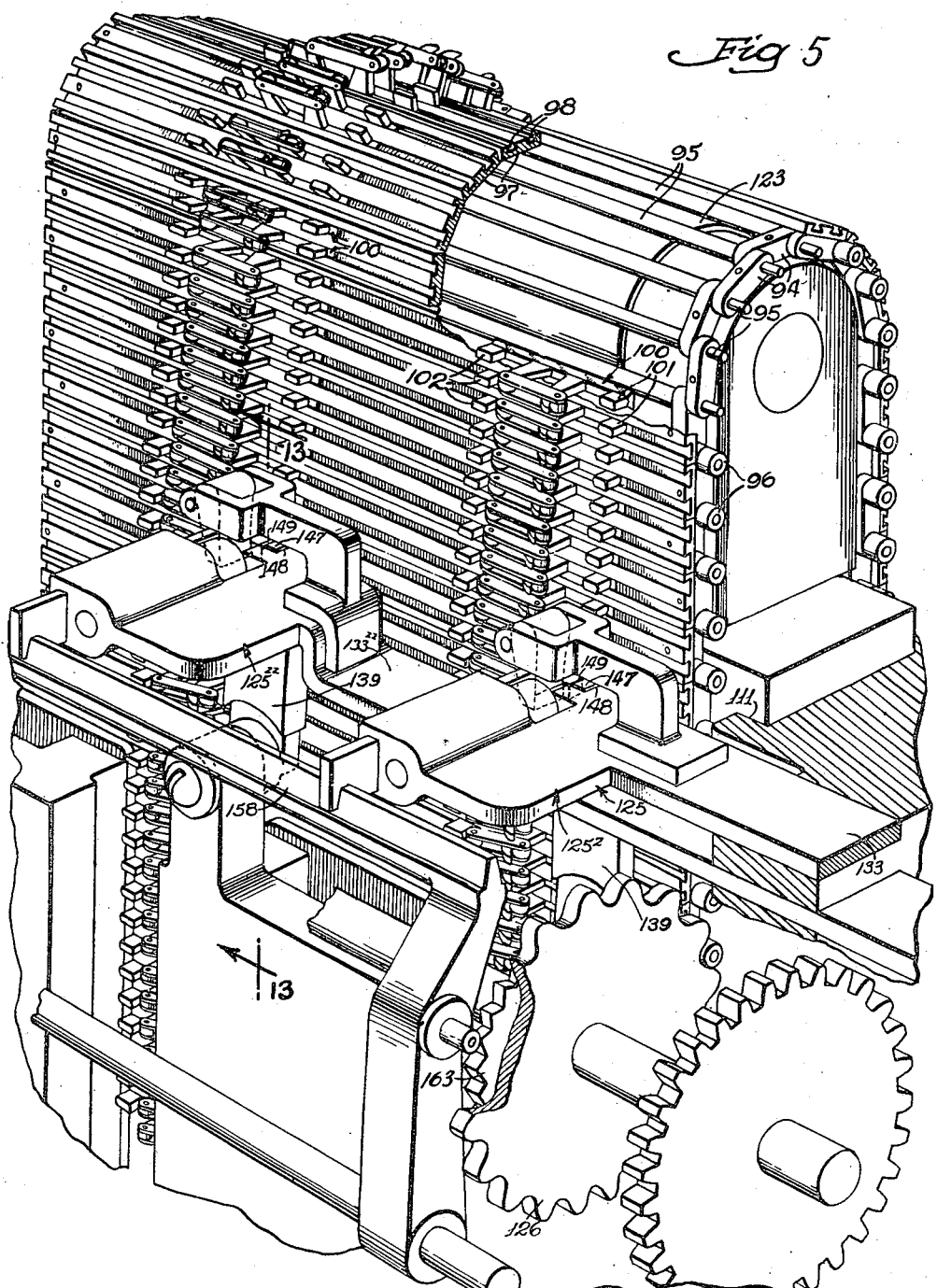

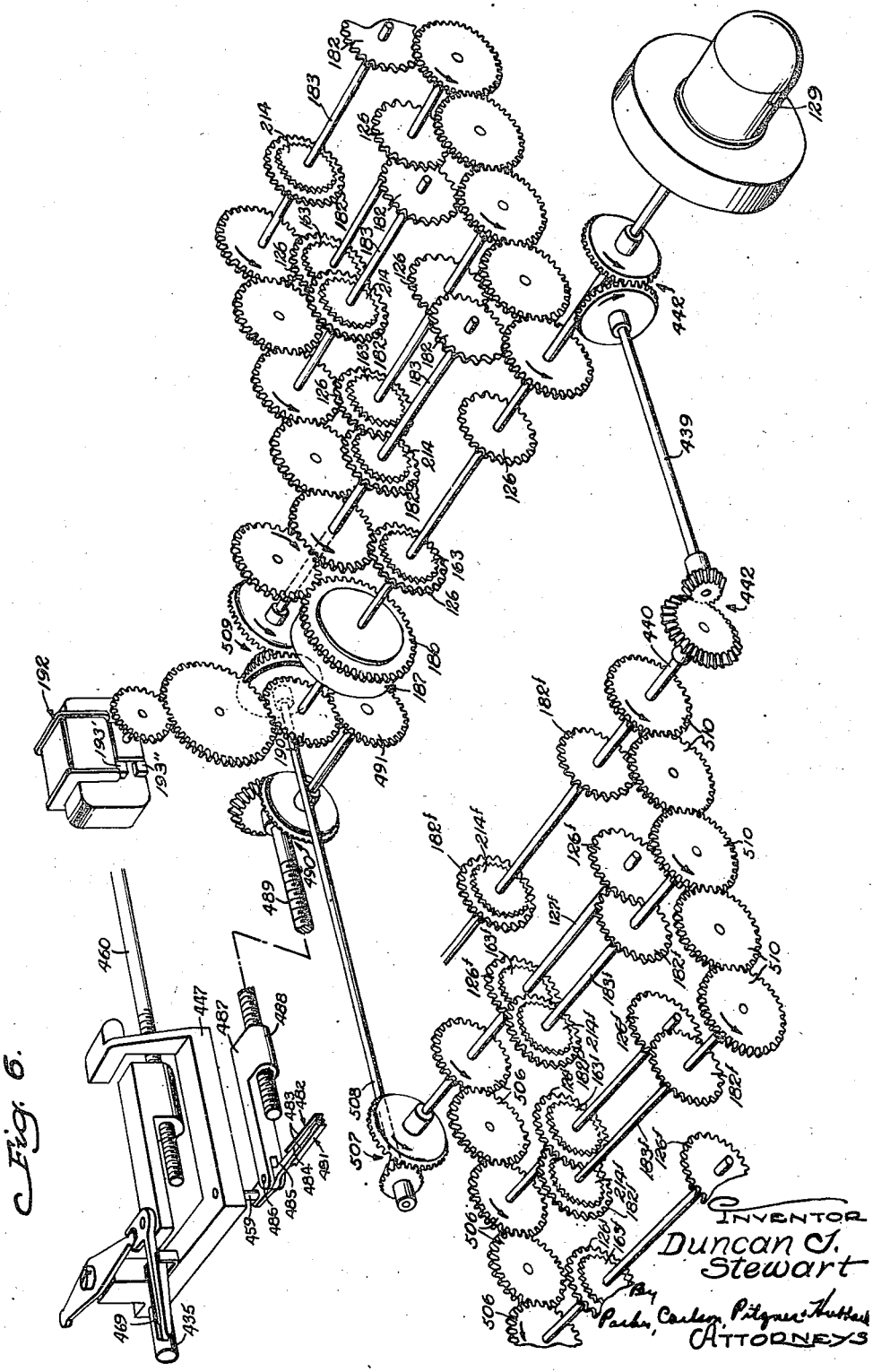

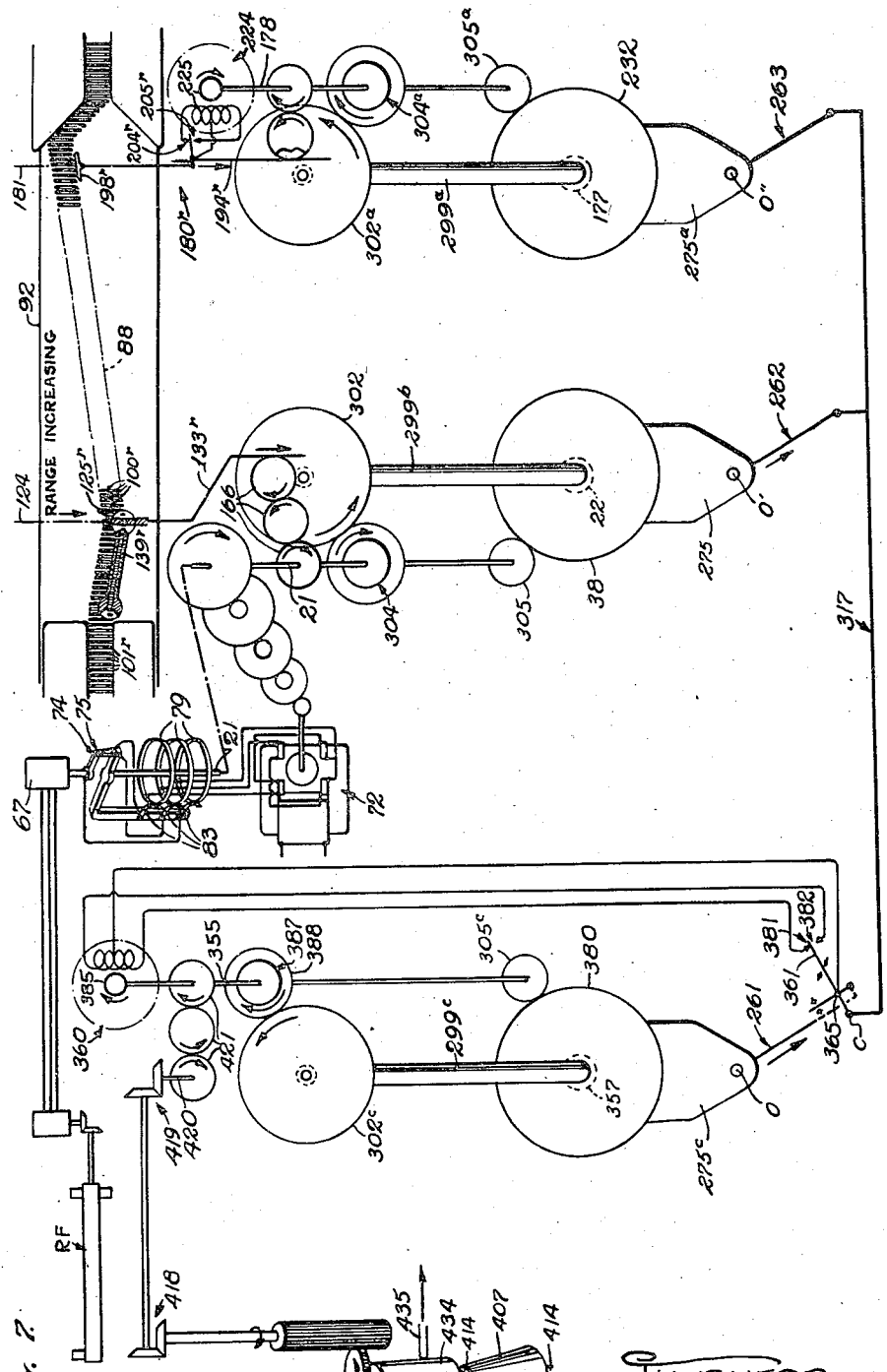

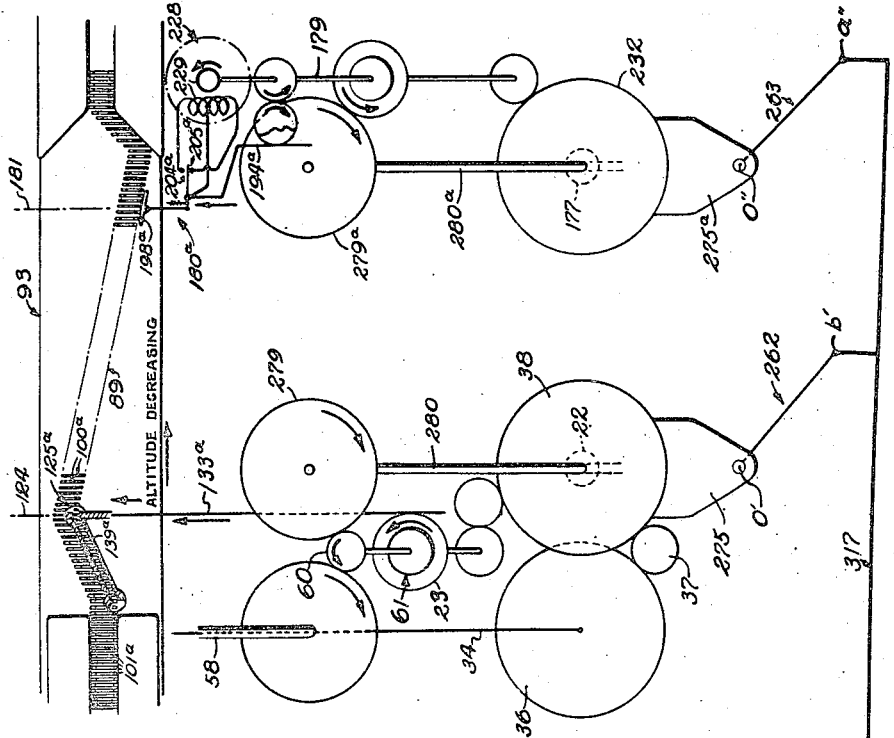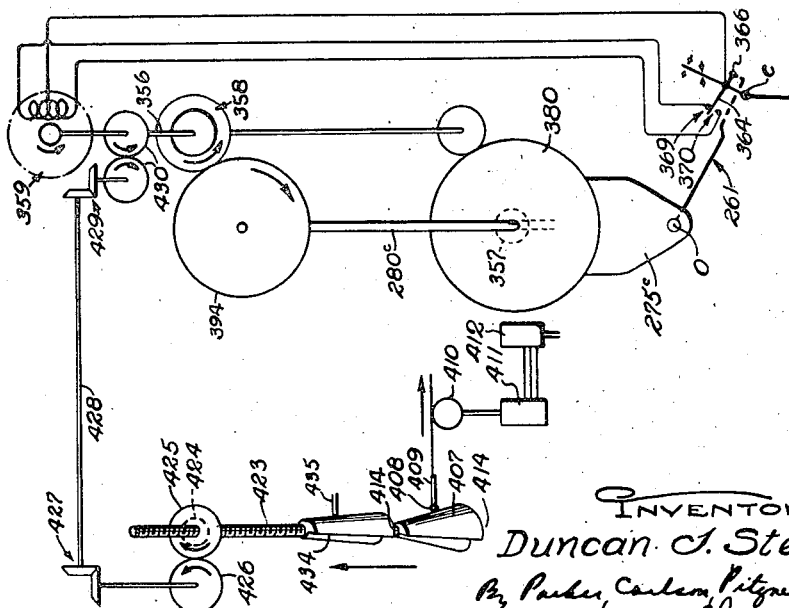

June 1, 1948.　　　　D. J. STEWART　　　　2,442,384
FIRE CONTROL COMPUTER HAVING NONUNIFORM
TARGET FLIGHT COMPENSATING MECHANISM
Filed March 17, 1943　　　　　　　　13 Sheets-Sheet 12

INVENTOR
Duncan J. Stewart
By Parker, Carlson, Pitzner & Hubbard
ATTORNEYS

Patented June 1, 1948

2,442,384

UNITED STATES PATENT OFFICE 2,442,384

FIRE CONTROL COMPUTER HAVING NON-UNIFORM TARGET FLIGHT COMPENSATING MECHANISM

Duncan J. Stewart, Rockford, Ill., assignor to Barber-Colman Company, Rockford, Ill., a corporation of Illinois Application March 17, 1943, Serial No. 479,431

13 Claims. (Cl. 235—61.5)

The invention pertains to the art of predicting the future position of a moving object or target so that the prediction may be used in controlling the firing of a projectile to intercept the target.

Predicting systems usually operate on the assumption that the target being observed is traversing and will continue to traverse a straight path at constant speed. Accordingly, any departure from such path or non-uniformity in velocity up to the predicted time of target interception will result in an inaccuracy. The primary object of the present invention is to measure any such departure or inaccuracy and correct therefor.

Another object is to compare the actual position of the target as observed at a given time with the position previously computed for the same time and thereby determine the error in the prediction.

A further object is to make the comparison continuously and modify the current or present prediction correspondingly.

A more detailed object is to keep a record of the measurements of the predicted future positions of the moving target and later compare these with measurements of the actual position of the target at corresponding times.

A further object is to divide the measured correction into parts corresponding to the respective coordinates that locate the target in space.

The invention also resides in the novel character of the mechanism for determining the correction and the manner of modifying the current predictions.

Other objects and advantages of the invention will become apparent from the following detailed description taken in connection wth the accompanying drawings, in which Figure 1 is a schematic view illustrating various target positions in relation to the predicting and projecting apparatus.

Fig. 4 is a fragmentary plan view of the main parts of the improved predictor.

Fig. 5 is an enlarged fragmentary perspective view of one of the recorders.

Fig. 6 is a fragmentary perspective view of the mechanism for driving the record carriers.

Figure 9:
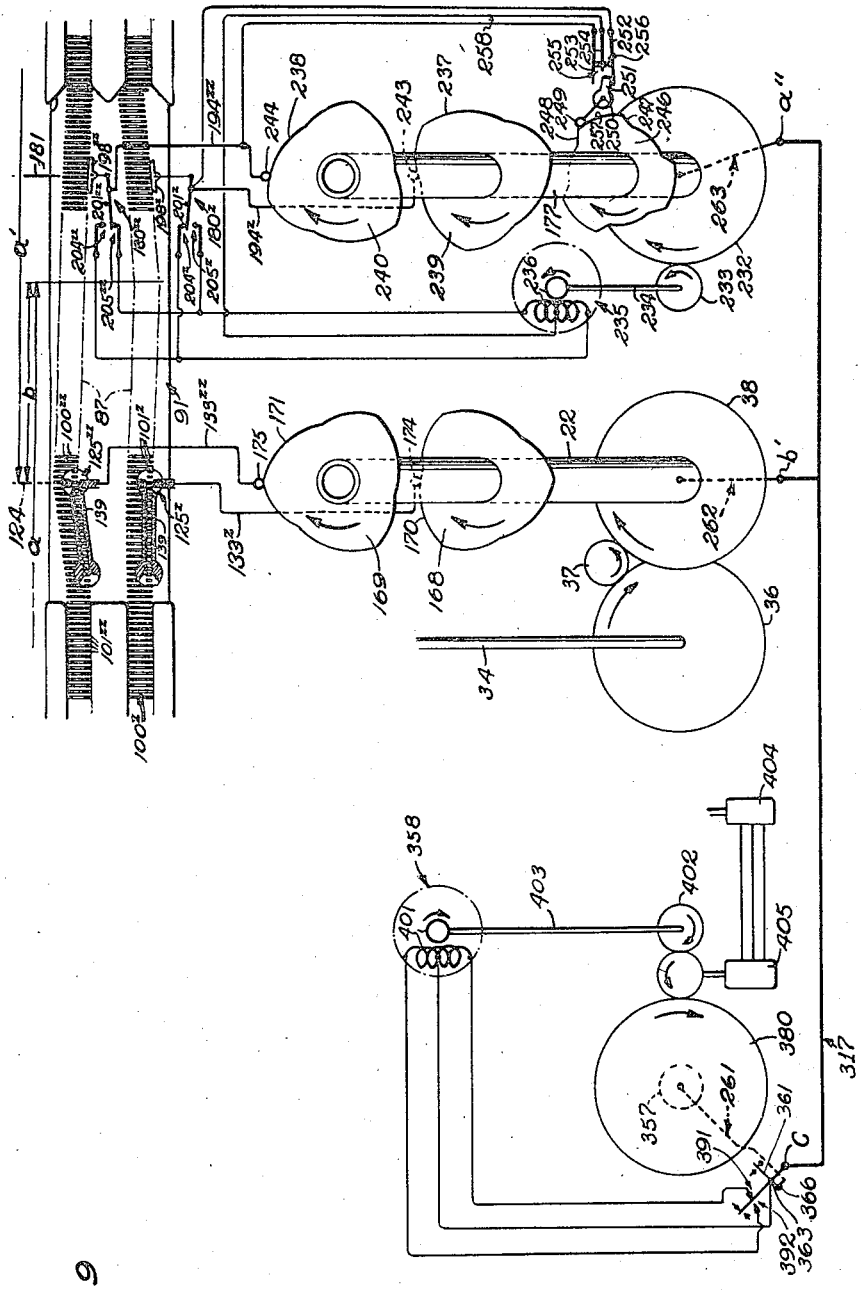

Figs. 7, 8, and 9 are schematic views and wiring diagrams of the range, altitude and azimuth records and the mechanisms for recording and reading the same.

Figure 10:
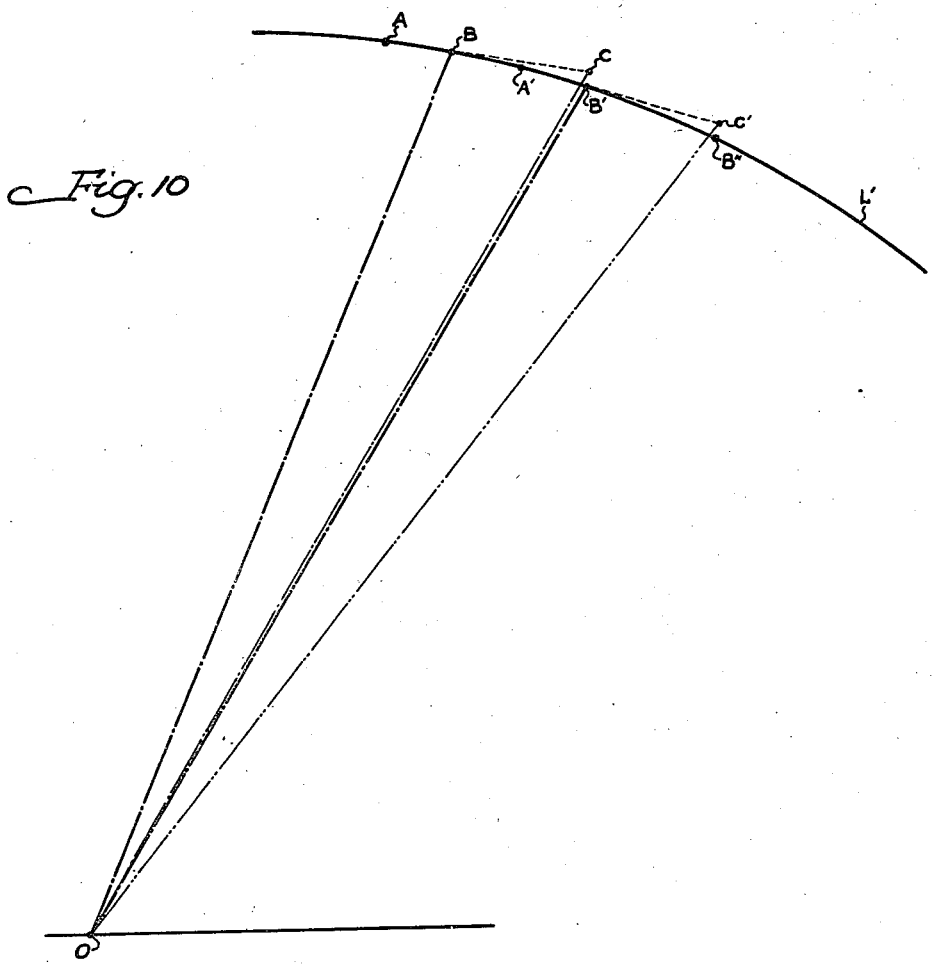

Fig. 10 is a diagrammatic view showing different target positions involved in making the correction.

Figure 3:
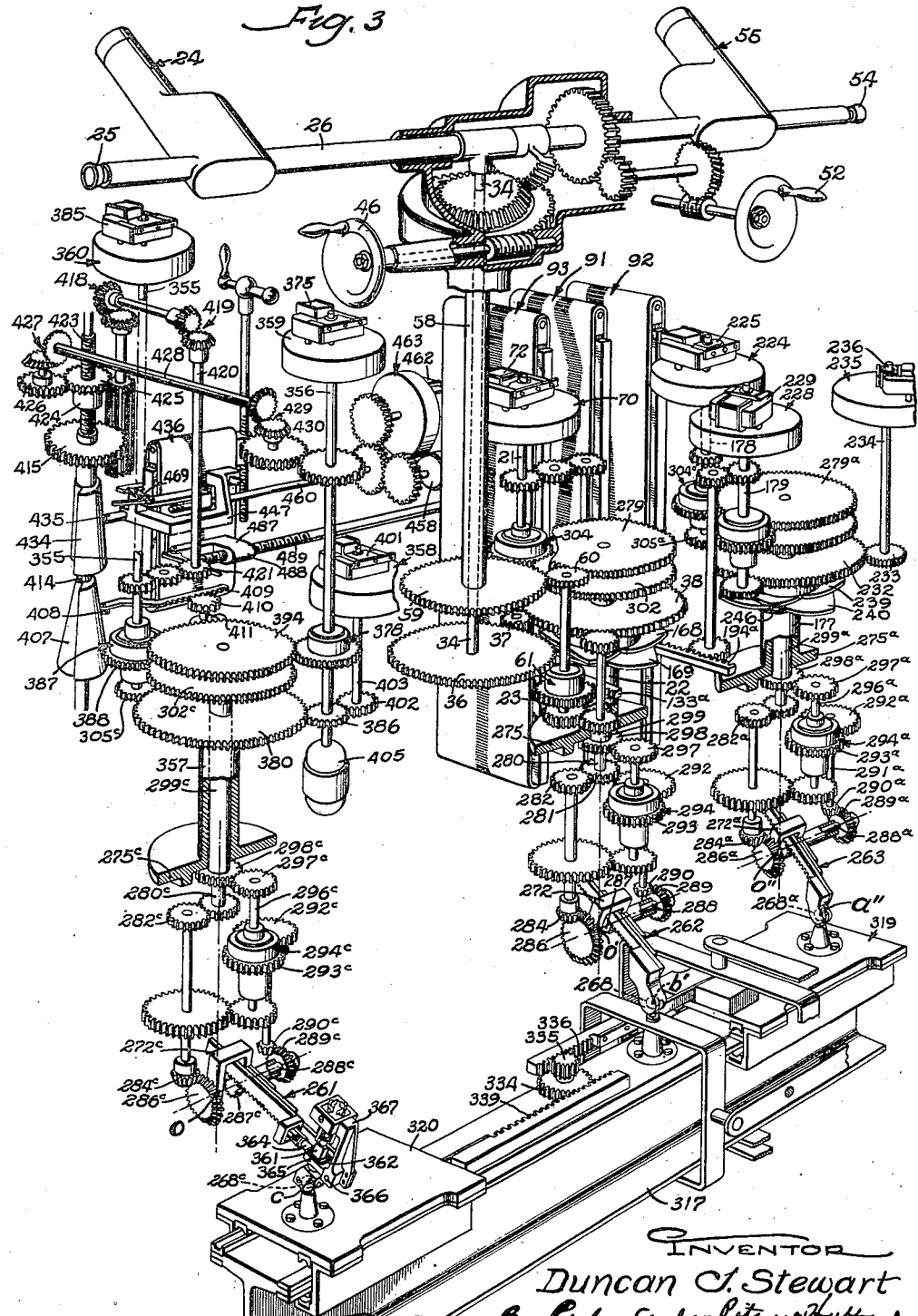
Fig. 3 is a fragmentary perspective view of the main operating parts of the apparatus not including the correcting mechanism.
Figure 11:
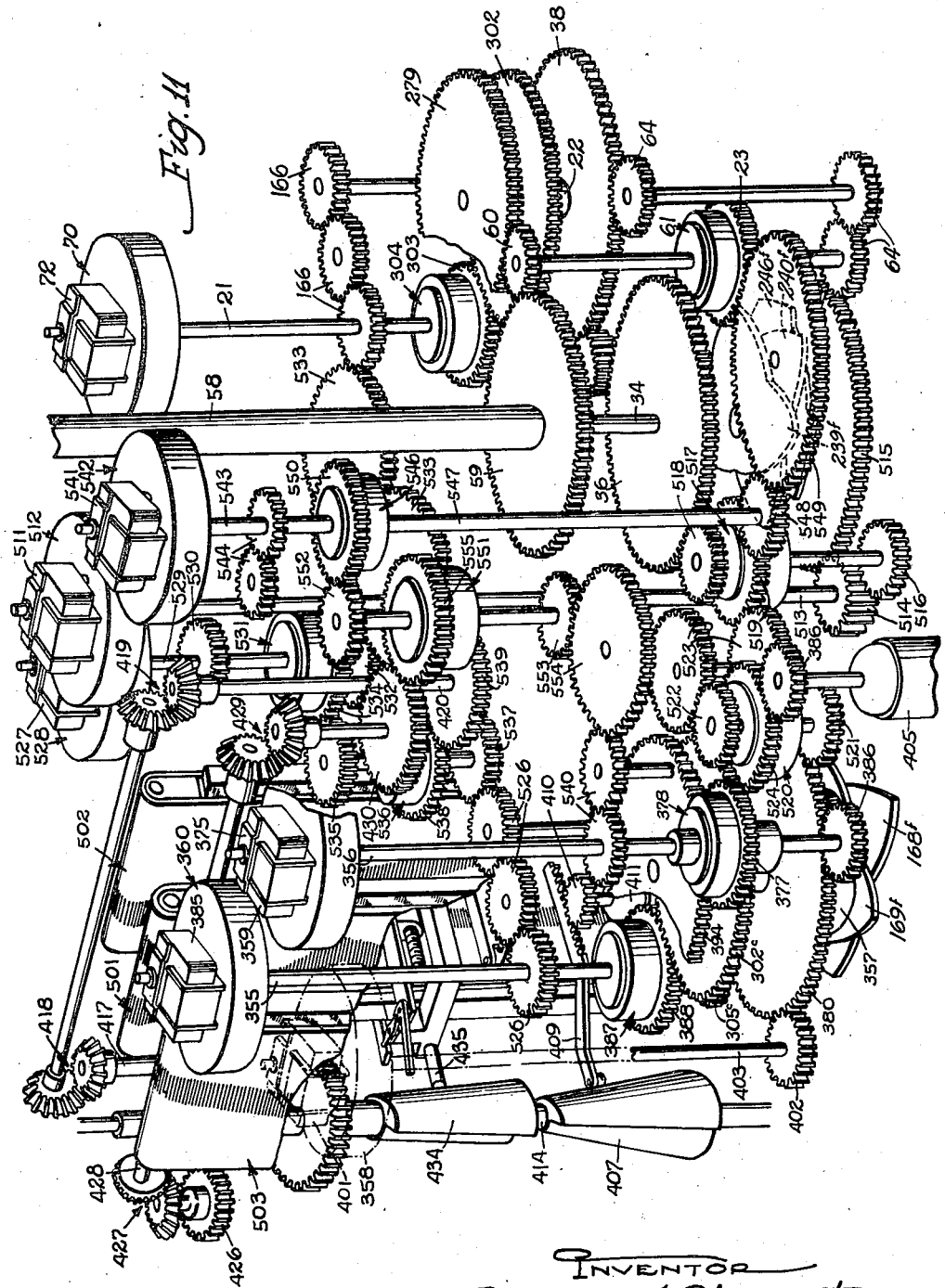

Fig. 11 is a perspective view similar to Fig. 3 but on a larger scale and including the correcting mechanism.

Figure 12:
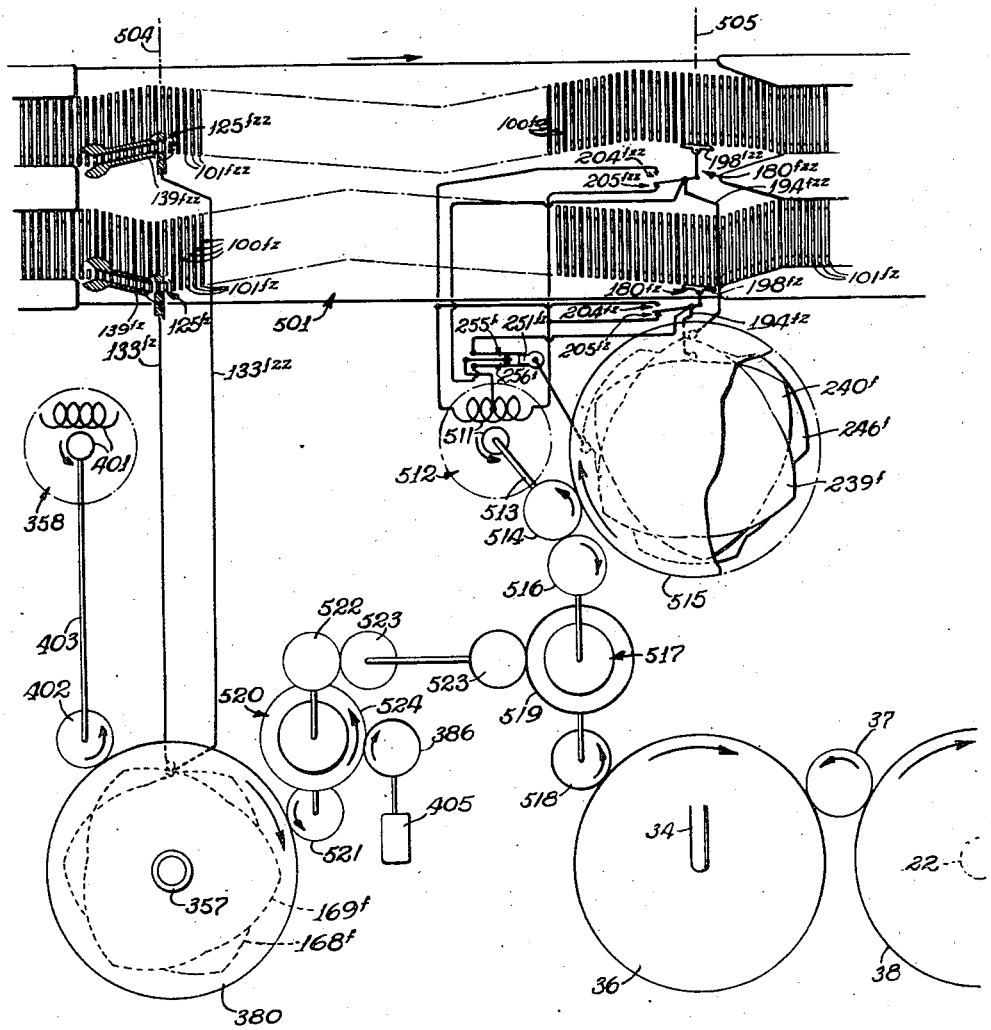
Figure 13:
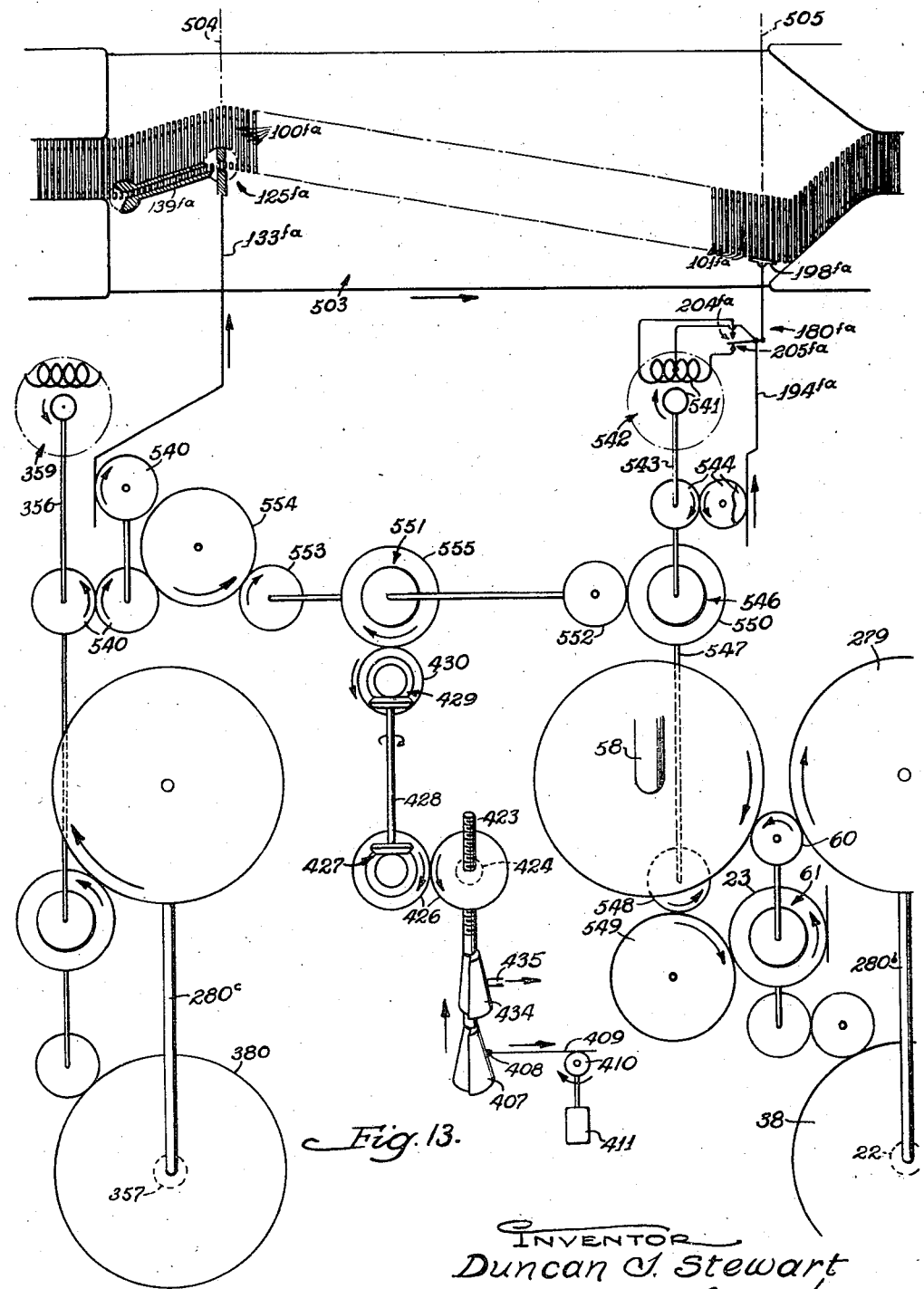
Figure 14:
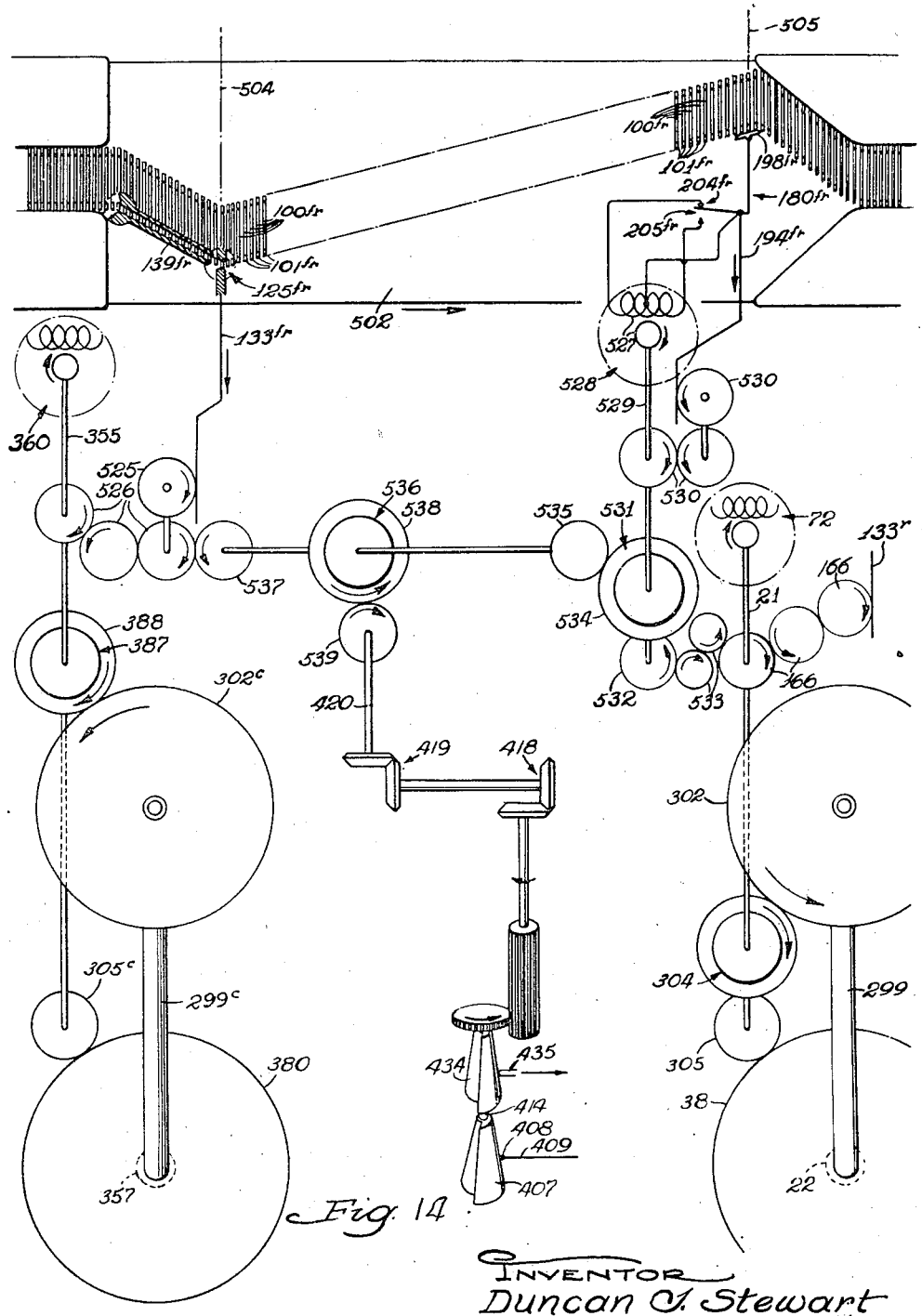

Figs. 12, 13, and 14 are schematic views and wiring diagrams of the mechanisms for setting and reading the azimuth, altitude and range records of the computed future position and for introducing the corrections.

While the invention is susceptible of various modifications and is applicable to many different kinds of predicting systems, it is embodied for purposes of illustration in the system shown in an application Serial No. 445,259, filed May 30, 1942, by myself and Howard D. Colman to which application reference is made for more details. It is to be understood that I do not intend to limit the invention by such exemplary disclosure but aim to cover all modifications, alternative constructions, methods and uses falling within the spirit and scope of the invention as expressed in the appended claims.

The general method of prediction as described in the aforesaid application involves tracking a moving target T continuously from a point O of observation to measure the values of the separate coordinates that locate the target in its present position B (Figs. 1 and 2), preparing continuous records of the changing values of these coordinates, sensing such records to determine the coordinates of a past position A of the target immediately preceding the present by a known time interval, and from the six coordinate measurements, computing the coordinates of the target in its future position C. A predetermined ratio is maintained between the past interval and the interval by which the computed target position C leads the present position B, and this past interval is varied progressively so that the future time represented by distance BC will always be equal to the time required for the projectile to travel from the gun or projector G to the computed position C.

While the foregoing method may be practiced using any desired coordinate system, the polar system is employed in the apparatus to be described herein. That is to say, the present target position is ascertained by measuring the slant range $r_b$ of the target in its present position (distance OB, Fig. 2), the altitude angle $\theta_b$, and the azimuth angle $\phi_b$ relative to any desired reference line. The coordinates locating the target in the past position A will be referred to herein as $r_a$, $\theta_a$, and $\phi_a$ while the predicted coordinates corresponding to the future position C are $r_c$, $\theta_c$, and $\phi_c$.

With the exception of a finder RF for measuring the range coordinate, all of the parts of the predictor are combined in a single unit indicated generally at P and joined by suitable electrical connections by which the coordinate measurements are transmitted from the director to the projector or gun G. The latter incorporates suitable servo mechanism for quadrant elevation and azimuth angle adjustment, and in the case of explosive projectiles, a fuse setter of well known construction.

*Measuring present and past target positions*

These steps in the above method are carried out by apparatus which is fully illustrated and described in the aforesaid application. To simplify this disclosure, the apparatus is illustrated somewhat diagrammatically and only a general description will be given using the same numerals on corresponding parts in order to facilitate reference to said application for further details.

To measure the present azimuth and altitude coordinates, the target is observed through the eye pieces 25 and 54 of telescopes (Fig. 3) 24 and 55 carried by a horizontal shaft 26 on the upper end of a vertical shaft 34 journaled in the machine frame (not shown). One observer turns a hand-wheel 46 to follow the motion in azimuth, and this motion is communicated through the shaft 34, a gear 36 thereon, and a gear 37 to a gear 38 on a vertical sleeve 22 (Figs. 3, 4, 7, 8, 9, and 11) which is thus positioned angularly in accordance with the present azimuth.

The other observer turns a crank 52 (Fig. 3) to follow the target in altitude and this motion is transmitted through a sleeve 53 to a differential 61 which subtracts the component due to the azimuth motion so that the intermediate gear 23 (Figs. 3, 4, 8, 11, and 13) of the differential turns back and forth with changes in the target elevation and thus indicates the true altitude angle $\theta_b$.

The range as measured by the finder RF is transmitted electrically to a Selsyn receiver 67 (Fig. 7) which actuates switches 74 and 75 that control a follow-up motor 72 and cause a shaft 21 (Figs. 3, 7, 11, and 14) to be positioned angularly in accordance with changes in present range $r_b$.

As a preliminary to ascertaining the coordinates of the target at the selected past time, position A, separate mechanical records are prepared of the present coordinates as set up on the present coordinate indicators 21, 22, and 23. In the present instance, each record comprises a succession of mechanical elements or lugs 101 (Fig. 5) arranged in one or more rows that extend longitudinally of a flexible carrier in the form of an endless flat loop of chain comprising a series of pivotally connected links 94 and connecting pins 95 extending around spaced rollers 123, the latter being slidable vertically in guideways 111. The links carry bars 97 having channels 98 extending edgewise of the chain and constituting guides for individually adjustable cars 100 with which the control lugs 101 are rigid.

The major parts of the chains and their setters and sensers are numbered correspondingly, the exponents $z$ and $zz$ being used to designate the parts of the azimuth record and exponents $r$ and $a$ for the range and altitude records respectively.

On one side of the loop, rollers 96 (Fig. 5) on the chain links mesh with sprockets 126 which are driven at a constant speed by a motor 129 (Figs. 4 and 6) to advance the chain and the lugs 101 at constant speed past a recording position 124 (Fig. 9). At this point the successive lugs pass between the walls 148 and 149 of a notch 147 (Fig. 5) in a setter 125 which is mounted on a bar 133 to move laterally of the chain. The lugs 101 are shifted at the setting position, and beyond the setter the row becomes shaped, in accordance with the changes in the position of the setter 125. By means of a swinging guide 139, the lugs are cammed toward the notch 147 as they approach the setter. While in control of the setter, the cars 100 are locked frictionally in the grooves so that the positions are retained until the lugs have passed a senser 180 (Figs. 4 and 7 to 9) on the opposite side of the chain loop after which the clamping force is released to free the cars.

Figure 1:
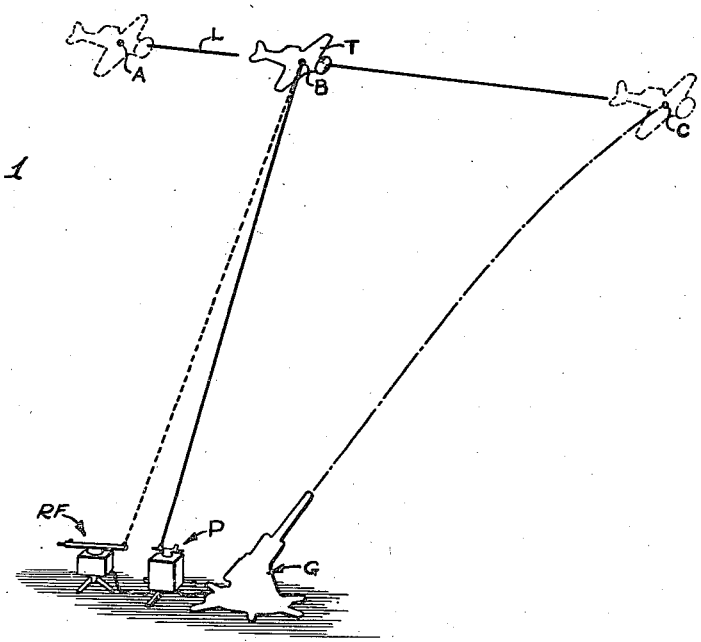
Figure 2:
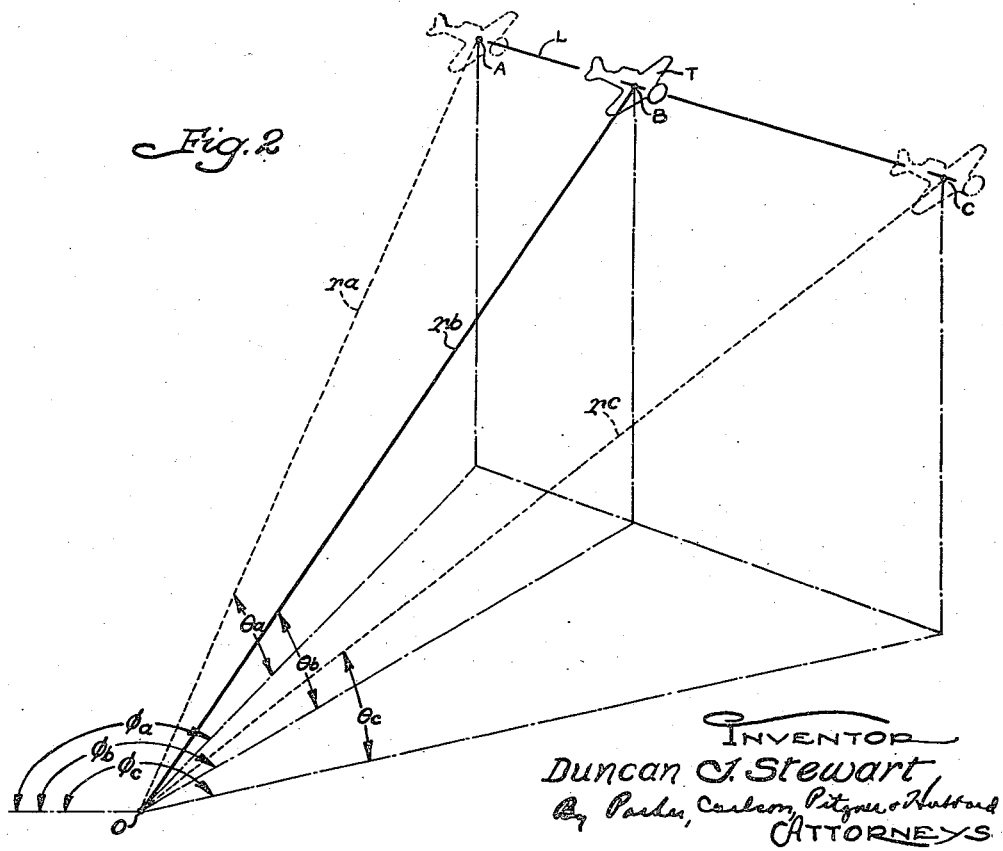
Fig. 2 is a similar view illustrating one coordinate system that may be used.

Each senser 180 is movable edgewise of the chain and has pivoted thereon a feeler or shoe 198 (Figs. 7 to 9) which bears against the chain lugs 101 passing the sensing position 181 and actuates control switches 204 and 205 in accordance with changes in the edgewise position of the lug then in active position. The senser is spaced from the setter a distance corresponding to the past time interval above referred to and represented by the distance AB (Fig. 1). To enable this interval to be varied as above described, the chain meshes adjacent the senser with sprockets 182 (Fig. 6) which are on a shaft 183 and driven at a speed varied automatically in accordance with the computed time of projectile flight represented by the distance OC. To this end, the shaft is driven from the intermediate gear 186 of a differential 187 having one terminal driven by the constant speed chain drive motor 129 and the other terminal driven intermittently, as will appear later, in accordance with changes in the time of projectile flight.

The chain 91 (Figs. 5 and 9) on which the changing values of present azimuth are recorded has two rows of control lugs $101^z$ and $101^{zz}$ which are set to form the azimuth record 87. The range and altitude chains 92 and 93 (Figs. 7 and 8) each have one row of lugs $101^r$ and $101^a$ respectively, these being adjusted to form the range and altitude records 88 and 89.

To set the control lugs $101^a$ in accordance with the true value of the present altitude, the setter slide $133^a$ (Figs. 4 and 8) is shifted back and forth with changes in the angular position of the altitude indicator or gear 23. This is accomplished by a direct mechanical connection, the slide $133^a$ being formed with rack teeth meshing with the gear 23.

In a similar way, the slide $133^r$ is moved in unison with the range indicator or shaft 21. The connection (Figs. 4 and 7) is through idler gears 166 of the same size, the terminal one meshing with rack teeth on the extended end of the slide $133^r$. The row of fingers $101^r$ beyond the setting line 124 is inclined as shown in Fig. 7 in response to a progressive increase in the range coordinate and would be inclined reversely when the value of the range coordinate is decreasing.

To permit of an unlimited motion of the target tracking mechanism in azimuth, the azimuth record 87 is set up in two parts on the lugs $101^z$ and $101^{zz}$ by cams 168 and 169 (Figs. 3, 4, and 9) each having successive inclines of reverse slope. With this cam arrangement, the two rows of lugs $101^z$ and $101^{zz}$ are set in identical patterns although they are shifted relative to each other longitudinally of the chain by an amount corresponding to the angular displacement of the cams 168 and 169 relative to each other, both followers 174 and 175 for these cams moving along the same radial line. It will be observed that the control lugs $101^z$ and $101^{zz}$ forming the spaced subdivision $a$ and $a'$ of the two cam patterns are set by the cam surfaces 170 and 171 respectively and that within the length $b$ in which the subdivisions overlap, they have the same inclination. The rows produced by the corresponding cam inclines will be inclined reversely during counterclockwise rotation of the disks so that a reversal in the direction of the azimuth change is evidenced by a reversal in the slope of both rows of lugs $101^z$ and $101^{zz}$.

From the coordinate records 87, 88 and 89 prepared as above described, it is possible to locate the second point A and thus determine the line of flight L as well as the distance between the points. This is accomplished by sensing the traveling records continuously and simultaneously at the points 181 above referred to, setting three indicators in accordance with the azimuth, range and altitude coordinate values $\phi_a$, $r_a$, and $\theta_a$ thus sensed. Herein, the azimuth and range indicators are constructed the same as the present indicators and comprise a sleeve 177 (Figs. 3 and 9) which is positioned angularly according to the true value of the past azimuth and a shaft 178 (Figs. 3 and 7) for past range. A shaft 179 (Figs. 3 and 8) is adjusted angularly according to the altitude of the target in the past position A.

The past range indicator or shaft 178 is actuated by a follow-up mechanism 224 (Figs. 3, 4, and 7) whose reversible electric motor 225 is controlled selectively by the switches $204^r$ and $205^r$ which are positioned by the shoe $196^r$ of the senser $180^r$. The past altitude indicator 179 is actuated in a similar way by a follow-up mechanism 228 (Figs. 3, 4, and 8) including a motor 229.

Referring to Figs. 3 and 9, the azimuth indicator or sleeve 177 is constructed and mounted in the same manner as the present azimuth indicator 22. Keyed to this sleeve is a gear 232 meshing with a gear 233 on the slow speed shaft 234 of a follow-up unit 235 having a motor 236. Because of the different way of recording the azimuth coordinate, the motor is controlled in a different manner. The subdivisions $a$ and $a'$ of the divided record 87 are used alternately in controlling the motor to cause the past indicator to follow the movements of the present indicator but at a later time. Thus, the control lugs $101^z$ and $101^{zz}$ coact with inclines 237 and 238 on cam disks 239 and 240 which inclines are duplicates of the inclines 170 and 171 on the disks 168 and 169. The disks are fast on the azimuth indicator 177 and are engaged along the same radial line by followers 243 and 244 which are carried by the slides 194$^z$ and 194$^{zz}$ of the azimuth sensers $180^z$ and $180^{zz}$ and therefore impart the proper follow-up motions to the control switches.

To utilize the subdivisions $a$ and $a'$ of the azimuth record alternately, switching means is provided for transferring the control of the motor 236 from the switches $204^z$ and $205^z$ to $204^{zz}$ and $205^{zz}$ and vice versa. The transfer is made in response to movement of the past indicator 177 and within the overlap $b$ of the different record subdivisions during which time the position of the indicator, as determined by the joint action of the lugs $101^z$ and one incline 237, will be identical with the indicator position as determined jointly by the lugs $101^{zz}$ and the active cam incline 238. The transfer is effected by inclines 247 and 248 alternating in angularly spaced relation around a disk 246 and acting on a follower 249 on a shaft 250 which carries an arm 251 disposed between two spring contacts 252 and 253 cooperating with a stationary contact 254 to form two switches 255 and 256.

With the parts conditioned as shown in Fig. 9, the switches $204^{zz}$ and $205^{zz}$ and the control lugs $101^{zz}$ are in control. In response to closure of one switch $205^{zz}$ by a change in the position of one of the control lugs $101^{zz}$ passing the reading position 181, as shown, the motor 236 is operated to turn the azimuth indicator and the cams 239 and 240 clockwise. Reverse turning of the disk and indicator occurs when the other switch $204^{zz}$ is closed in response to a reversal in the slope of the line of lugs $101^{zz}$ passing the sensing shoe $198^{zz}$. If there is no change in the past azimuth, the passing lugs $101^{zz}$ will parallel the chain path and both switches will remain open and the motor 236 will be idle. As in the case of the other readers, the shoes $198^z$ and $198^{zz}$ are pivoted on the ends of the switch arms $201^z$ and $201^{zz}$ which in turn are pivoted intermediate their ends on the slides $194^z$ and $194^{zz}$, the latter being the followers of the follow-up cams 239 and 240. With this arrangement, the effective position of each shoe is determined by the position of the lug 101 engaging it at the reading position 181.

*Computing coordinates of future target position*

In the exemplary prediction, the coordinates of the present and past target positions as set up in the six indicators 21, 23, 22, 177, 178, and 179 are combined by geometrically representing in miniature the present and past target positions A and B, locating on a line L through these positions a point corresponding to the future position C, and measuring the coordinates of the latter point. The computer comprises generally three arms 261, 262, and 263 (Figs. 3, 7, 8, and 9) of variable lengths swingable about vertical and horizontal axes intersecting fixed points O, O', and O'' which are spaced apart short distances along a straight line, the arms being pivotally connected at their free ends $a''$, $b'$, and $c$ to a bar 317 which maintains the points in a straight line and variably spaced so that the distance $a''c$ bears a fixed ratio, 3 in this instance, to the distance $a''b'$. The fixed pivots are spaced in the same ratio, that is, $OO''/O'O''$ equals 3. The arms and the bar 317 form a linkage system which operates mechanically to adjust the length and position of the arm 261 and the point $c$ in accordance with changes in the lengths and angular positions of the arms 262 and 263.

The points $a''$ and $b'$ represent in miniature the past and present target positions as defined above and are positioned in space and relative to their pivots O'' and O' in accordance with measured coordinates of these target positions.

The motion of the present range indicator 21 is transmitted to a pinion 287 (Fig. 3) meshing with rack teeth on the arm 262 so that the latter is lengthened and shortened in accordance with the changing values of the present range $r_b$. The connection from the register 21 is through a differential 304, a gear 302, a shaft 299 concentric with the azimuth indicator 22 and gears 297, 298, a differential 294, and gears 293, 292, 290, and 289 to the pinion 287.

To tilt the arm 262 in altitude, a yoke 272 carrying the arm is tilted through a connection extending from the gear 59 through gears 60 and 279, a shaft 280, gears 281, 282, and 284 to a bevel gear 286 rigid with the yoke. The yoke 272 and the sleeve carrying the pinion 287 are supported on a frame 275 keyed to the azimuth indicator 22 so that the point of $b'$ turns in azimuth with this indicator.

Similar connections, the parts of which are indicated by corresponding reference numerals with the addition of the exponent $a$, are provided for positioning the arm 263 in accordance with the values of past range, past altitude and past azimuth as set up on the indicators 177, 178, and 179.

The point $b'$ is rigid with the bar 317 and the points $a''$ and $c$ are carried on slides 319 and 320 (Fig. 3) connected to racks 336 and 339 which mesh respectively with a pinion 335 and a gear 334 rigid with each other. This connection maintains the proper ratio in the spacing of the points $a''$, $b'$ and $c$.

With the linkage system constructed as above described, it will be observed that the ball $268^c$ or point $c$ will be moved in accordance with changes in the lengths and inclinations of the present and past position arms 262 and 263 while the ratio $a''c/a''b'$ is maintained fixed. The points $a''$, $b'$ and $c$ are of course always maintained in a straight line. Accordingly, the movements of the points $a''$ and $b'$, which represent in miniature the past and present target positions, are utilized through the medium of the pantograph system to combine the present and past coordinates as recorded on the indicators and thus compute or establish the location of the point $c$ which represents the future or predicted target position.

To ascertain the azimuth, range and altitude coordinates of the computed future target position, the future arm 261 is adjusted in length and position in response to changes in the position of the point $c$, and these adjustments are communicated to shafts 355 and 356 and a sleeve 357 (Figs. 3, 7, 8, 9, 12, 13 and 14) which constitute respectively the indicators for the future range, future altitude and future azimuth coordinates $r_c$, $\theta_c$, and $\phi_c$. These prediction registers and the arm 261 are constructed and mounted on the main frame in the same way as the present and past registers previously described, and the connections between the arm and the registers are of the same general construction, the main parts being indicated by corresponding reference numerals to which the exponent $c$ has been added.

Instead of making the socket for the ball $268^c$ rigid with the arm 261 as in the case of the arms 262 and 263, a connection is provided which permits of relative movement between the arm and socket in three directions respectively corresponding to the range, azimuth, and altitude movements of the point $c$. The degree of such movement is sufficient to permit the actuation of pairs of switches 391 and 392, 369 and 370, and 381 and 382 (Figs. 7, 8 and 9) respectively controlling follow-up mechanisms 358, 359 and 360 (Figs. 3, 7, 8, 9, 11, 12, 13 and 14) by which the future azimuth, altitude, and range indicators and the arm 261 are actuated.

To these ends and as shown more in detail in the aforesaid pending application, the ball socket is rigid with a lever 361 (Fig. 3) projecting through a hole in a tube 362 to which the lever is pivotally connected intermediate its ends to swing about an axis 363 parallel to the arm 261 and shown diagrammatically in Fig. 9. The tube 362 in turn projects through a hole in a lever 364 and is pivotally connected to the latter by pins 365 which extend perpendicular to the first mentioned axis. The lever 364 is disposed between the lower end of the arm 261 and a bracket 367 thereon and is pivoted on a pin 366.

The multiple gimbal joint thus formed provides for three independent motions of the pantograph point $c$ relative to the arm 261 and functions to segregate from each other the motions of the point which are due to changes in azimuth, altitude and range. Thus, the lever 364 is swung about the pivot 366 in response to movements of the ball $268^c$ in altitude (Figs. 3 and 8). Such actuation controls switches 369 and 370 which govern the operation of the follow-up mechanism 359 to position the future altitude register or shaft 356 in accordance with the motions of the ball $268^c$ resulting from changes in the positions in points $a''$ and $b'$ caused by changes in the past and present altitude coordinates. The follow-up motion is transmitted from the shaft 356 through the differential 358, the gear 394, the shaft $280^c$, the gears $281^c$, $282^c$ and $284^c$ to the bevel gear $286^c$ which is rigid with the yoke $272^c$.

Changes in the future range as computed by the pantograph system cause movement of the lever 361 (Figs. 3 and 7) about the pivot 365 to operate the switches 381 and 382 and control the reversible motor 385 of the follow-up mechanism 360. This drives the future range indicator shaft 355 which is on one terminal of a differential 387 whose intermediate gear 388 meshes with the gear $302^c$. The other differential terminal is connected by a gear $305^c$ to the gear 380 on the azimuth indicator. Thus, the motor 385 operates through gears $302^c$, $298^c$, $297^c$ (Fig. 3), the differential $294^c$ and the gears $292^c$, $290^c$, $289^c$ and the pinion $287^c$ to adjust the length of the arm 261. In response to closure of either of the switches 381 and 382 following a change in the computed or future range, the motor 385 runs the pinion $287^c$ in a direction to lengthen or shorten the arm 261 to correspond to such change. The motor stops when the follow-up motion imparted to the switch contacts causes the active switch to be opened.

Changes in the future azimuth as determined by the pantograph system cause swinging of the lever 361 (Figs. 3 and 9) at right angles to the range motion and about the pivot 363. In these motions, the arm 361 operates switches 391 and 392 controlling a follow-up motor 401 which operates through reduction gearing to drive a shaft 403 carrying a gear 402 that meshes with the gear 380 on the azimuth indicator or sleeve 357. As a result, this sleeve will be turned in one direction or the other according to which of the switches 391 and 392 is closed, and the motion will continue until the arm 261 has followed up the movement of the lever 361 and opened the controlling switch. As in the case of the present indicators, the arm 261 and all of the parts for actuating the same are carried by the frame $275^c$ which in turn is journaled in the main frame.

From the foregoing, it will be observed that the linkage system, which is actuated in accordance with changes in the present and past coordinates, geometrically computes the future target position as represented in miniature by the point $c$ and controls the switches by which the follow-up mechanisms are actuated to set up the separate indicators and thereby segregate the computed future coordinates.

The motions of the future azimuth indicator 357 may be utilized directly to control the positioning of the gun in this coordinate. This may best be accomplished by providing a Selsyn transmitter 405 (Figs. 3 and 9) having its rotor fast on a shaft which carries the gear 386 that turns in unison with the future azimuth register. A Selsyn receiver 404 (Fig. 9) of similar type is energized from the transmitter through the electrical connections above referred to and utilized in the usual way through a power driven servo actuator (not shown) to position the gun continuously so that except for the influence of windage and parallax, the gun is always set in accordance with the future azimuth coordinate as computed by the director.

Quadrant elevation of the gun is determined not only by the computed future altitude coordinate but also by the future range, trajectory, etc. In this instance, it is computed by means of a three-dimensional cam 407 (Figs. 3, 7, and 8), contoured in a manner well known in the art to provide a point on its peripheral surface radially spaced according to the correct quadrant elevation for each different combination of range and altitude. The cam is mounted for rotation in accordance with the changing value of the computed future range and is shifted axially with changes in the future altitude. Its follower, which comprises a ball 408, is mounted on the end of a rack bar 409 guided for endwise movement and meshing with a gear 410 on the rotor shaft of a transmitting Selsyn 411. Through electrical connections, the transmitter motion is reproduced in a Selsyn receiver 412 (Fig. 8) on the gun carriage and this receiver is utilized to control a servo actuator by which the gun is positioned for the correct quadrant elevation.

The cam 407 is fast on a vertical shaft 414 (Figs. 3, 7 and 8) journaled in the main frame and is turned back and forth with changes in the angular position of the future range indicator 355. Herein the connection includes interconnected gears 418 and 419, a vertical shaft 420 and gears 421.

To provide for axial shifting of the cam 407, a screw threaded portion 423 (Figs. 3 and 8) of the shaft 414 carries a nut 424 which is journaled in the main frame and carries a gear 425 meshing with a gear 426. The latter is driven through bevel gears 427, a horizontal shaft 428, and gears 429 and 430, one of the latter being fast on the shaft 356 or future altitude indicator.

The time required for the projectile to travel from the gun or other projector to the target in the predicted future position of the latter is also controlled by the future range and future altitude coordinates and computed by a three dimensional cam 434 (Figs. 3, 7, and 8) fast on the shaft 414 and engaged by a follower 435. The peripheral contour of the cam is such that the follower occupies a definite endwise position for each combination of future altitude and range which respectively determine the axial and angular positions of the cam. The time of flight thus determined may be corrected by the dead time mechanism 436 (Figs. 3 and 4) described in detail in the aforesaid application. The resultant motion is communicated to a Selsyn transmitter 453 (Fig. 4) which in turn is connected electrically to a receiving Selsyn (not shown) associated with the gun and controlling the fuse setter therefor. For this purpose, the drive shaft 460 of the Selsyn 458 is arranged to be driven by a follow-up mechanism 463 (Figs. 3 and 4) including a reversible motor 462 controlled by switches which are actuated by an arm 469 (Figs. 3 and 4) in response to movement of the time of flight follower 435. In this way, the Selsyn 458 is set in accordance with the computed time of flight combined if desired with a dead time correction of the proper sense and amount.

*Automatic adjustment of the past time*

As set forth above, the reversible motor 192 (Figs. 4 and 6) is operated intermittently to vary the speed of advance of the memory chains 91, 92 and 93 past the reading positions 181 and thereby correspondingly change the length of the memory or past time interval so as to maintain the fixed ratio between this interval and the computed value of the time of flight. Herein, the direction and extent of operation of the motor are controlled by switches 481 and 482, which are formed by contacts on arms 483 coacting with a tongue 484 on a lever 485 pivoted at 486 on a block 487 which is mounted adjacent the slide 447 and guided for movement parallel to the latter. Beyond the pivot, the lever is connected to a pin 459 depending from the slide 447 so that the lever 485 is swung back and forth with changes in the time of flight as evidenced by movement of the cam follower 435.

The block 487 (Figs. 3 and 6) carries a nut 488 into which threads a shaft 489 connected through bevel gears 490 and a gear 491 which meshes with the gear 190 driven by the motor 192 and carried by one terminal of the differential 187 (Fig. 6). Through these connections, the motor 192 acts as a follow-up to position the slide 487 in accordance with the time of flight changes, the differential 187 acting to add or subtract the motor motion to the constant speed motion imparted to the chains by the motor 129. Since the variable advance of the chains in accordance with changes in the time of flight is on the reader sides of the chains, the length of chain between the recording and sensing points and therefore the time interval that elapses before the reading of the records corresponds exactly to one-half the time of flight existing at the time the chain cars are read, not when they are set.

*Correction for non-uniform flight or accumulated errors*

The method of prediction and the apparatus thus far described forms the subject matter of application Serial No. 445,259 filed by myself and Howard D. Colman and is typical of the various types of predictors to which the present invention may be applied. Except for inherent inaccuracies arising in tracking the target, in converting and transmitting the measurements, or in manufacture, the apparatus, like others that are available, will register an exact prediction when the target is traveling in a straight line and at a uniform velocity. The present invention as covered by the appended claims aims to modify the predicting system first to detect errors in the prediction whatever their cause may be, and then to introduce corrections which will compensate for the errors fully or partially depending on their character. The nature of the correcting action and the wide applicability of the modification will be apparent from the following example. Assume, for example, that the target being tracked is moving in a path L' (Fig. 10) lying in a plane through the point O of observation and having uniform curvature. At the instant the target arrives at B, the director above described will compute the future position C on a line through B and the measured past position A. In view of the curved line of flight, the target actually passes through a point B' after the lapse of the computed time of flight. This becomes a new present position which together with a new past position A' controls the prediction of a new future position C' which also deviates from the actual future position B'' after the lapse of the computed time of flight from B'.

By measuring the sense and extent of the deviation CB' and adding this difference algebraically to the prediction C' registered by the director when the target is at B', this prediction will be corrected to locate the target at B'', the position which the target will actually occupy following the lapse of the computed time of flight from B', the line of flight changing at a uniform rate.

More particularly, the improved method of correction involves the steps of comparing, either intermittently or continuously, the values of the measured present coordinates with the values previously computed for a time corresponding to the present, and continuously applying the differences ascertained by such comparison to the coordinates of the future position as predicted on the basis of the actual present position. The process is continuous so that after the target has been followed for one and one-half times of flight, the corrections will compensate for non-uniform flight, and the target position actually measured at any instant will coincide with the previously computed position for that instant provided that the deviation from linear flight continues at a constant rate.

The accuracy of the compensation will, of course, depend on the character of the deviation of the target path from a straight line. In many instances, a correction ascertained repeatedly at relatively short intervals and applied continuously will be satisfactory and has the advantage of simplicity. The application of such a correction involves the provision of devices clutched to the prediction indicators periodically with provision for comparing their positions with those of the present indicators at the end of a time of flight, difference or correction thus obtained being added to the prediction then in control of the gun positioning.

Greater accuracy may be obtained by making the comparison above referred to continuously. This method is illustrated herein and will now be described. It involves continuously recording on separate traveling carriers the values $r_c$, $\theta_c$, and $\phi_c$ of the computed future coordinates as set up on the future indicators 355, 356, and 357, continuously reading these records at a time corresponding to the present, that is, advanced from the recording position by the computed time of flight, and comparing the coordinate values thus read with the present values $r$, $\theta$, and $\phi$ being measured and set up in the indicators 21, 22, and 23 whereby to determine the sense and amount of the differences that constitute the corrections to be combined with the repective coordinates of the future target position then being predicted.

*Advance of future record carriers.*—Referring now to Figs. 4, 6, and 10 to 13, the computed future azimuth, range and altitude coordinates are recorded on chains 501, 502 and 503 which are identical in construction to the present memory chains 91, 92, and 93. A detailed description is therefore unnecessary, the parts of the chains and the associated devices bearing the same reference numerals with the addition of the exponent $f$. The cars and the control lugs $101^{fz}$, $101^{fzz}$, $101^{fr}$, and $101^{fa}$ of these chains are positioned by setters $125^{fz}$, $125^{fzz}$, $125^{fr}$, and $125^{fa}$ which are actuated by the shifting of bars $133^{fz}$, $133^{fzz}$, $133^{fr}$, and $133^{fa}$, the lugs coacting with sensers $180^{fz}$, $180^{fr}$, and $180^{fa}$ which are on slides $194^{fz}$, $194^{fzz}$, $194^{fr}$, and $194^{fa}$. The chains are advanced past the recording position 504 by sprockets $126^{f}$ and past the sensing position 505 by sprockets $182^{f}$ (Fig. 6). Cams $163^{f}$ and $214^{f}$ rotatable with the sprockets control the locking and release of the cars $100^{f}$. The only difference between the present and future memory chains is that in the latter, the constant speed drive from the motor 129 through the shafts 439, 440 and gears 442 (see Fig. 6) is to the sprockets $182^{f}$ on the senser side instead of the sprockets $126^{f}$ on the setter side as with the present memory chains 91, 92 and 93.

The shafts $127^{f}$ of the sprockets $126^{f}$ are interconnected by gears 506 (Fig. 6) and driven through bevel gears 507, a shaft 508, and bevel gears 509 from one shaft 183 which, as previously described, is driven through the differential 187 so as to respond to the combined motions of the constant speed motor 129 and the motor 192 which is operated intermittently and selectively in opposite directions in accordance with changes in the computed time of flight. Since the drive motions from the shaft 439 to the shaft 440 (Fig. 6) and from the shaft 508 to the first shaft $127^{f}$ are reduced in a 1 to 2 ratio by the gears 442 and 507, the future chains will be advanced at one-half the speed of the present chains and with the same spacing of the setting and reading positions 504 and 505 (Figs. 12, 13 and 14), the interval between these positions equals the time of flight instead of one-half the time of flight as in the case of the present memory chains.

With the arrangement thus employed, the position of each chain car passing the sensing point corresponds to the coordinate value at a time prior to the sensing time by an amount equal to the time of flight at the time the particular chain car was set. As a result, the future memory chains provide a continuous record of the previously computed target position corresponding to the present time.

*Azimuth correction.*—By comparing Figs. 9 and 12, it will be seen that the future azimuth coordinates are set up on the chain 501 in the same way that the present coordinates are recorded on the chain 91. The bars $133^{fz}$ and $133^{fzz}$ of the setters $125^{fz}$ and $125^{fzz}$ are actuated by cams $168^{f}$ and $169^{f}$ (Figs. 11 and 12) which turn with the future azimuth indicator or sleeve 357. Thus, the rows of control lugs $101^{fz}$ and $101^{fzz}$ are shaped in accordance with the cam patterns and the changes in computed azimuth so as to form traveling records of this coordinate.

At the sensing position 505, the control lugs on the cars actuate shoes $198^{fz}$ and $198^{fzz}$ of sensers $180^{fz}$ and $180^{fzz}$ to position switches $204^{fz}$, $205^{fz}$, $204^{fzz}$ and $205^{fzz}$ and control the reversible motor 511 of a follow-up unit 512 (Figs. 11 and 12) which through appropriate reduction gearing turns a shaft 513 which carries a gear 514 meshing with a gear 515 with which cams $239^{f}$ and $240^{f}$ rotate. These cams are of the same shape as the setter cams $168^{f}$ and $169^{f}$ and their followers are on the slides $194^{fz}$ and $194^{fzz}$ through which the switches $204^{fz}$, $205^{fz}$, $204^{fzz}$, and $205^{fzz}$ are actuated to control the follow-up action so that the gear 515 is turned back and forth with changes in the computed future azimuth as read. A cam $246^f$ rotatable with the cams $239^f$ and $240^f$, actuates an arm $251^f$ and switches $255^f$ and $256^f$ to transfer the control of the motor 511 from one set of switches to the other so that the motion imparted to the gear 515 duplicates that of the future indicator 357 but later by an interval equal to the time of flight. Thus, the shaft 513 turns in accordance with the azimuth of the computed present position of the target and constitutes the indicator for the computed present azimuth.

To compare this computed azimuth with the actual present value $\phi_b$, the gear 514 on the indicator 513 drives a gear 516 connected to one terminal member of a differential 517 having its other terminal member driven by a gear 518 from the gear 36 which is positioned angularly in accordance with the actual present value of the azimuth coordinate as it is measured by tracking the target. If the target path is a straight line, the actual and computed values will be the same, and the intermediate gear 519 will occupy a neutral position in which no correction will be added. If however, the computed and actual values differ, for example, because the target is traversing a curved path, the intermediate 519 will move away from such position in a direction and by an amount corresponding to the deviation. Of course, the corrections are small so that a lever might be used instead of the differential gearing in making the comparison.

The correction thus determined is added algebraically to the computed value of the azimuth coordinate as transmitted to the azimuth Selsyn 405 from the future azimuth indicator 357. To this end, one terminal of a differential 520 is driven through a gear 521 from the gear 389 on the future azimuth indicator 357, and the other terminal carries a gear 522 driven by gears 523 from the intermediate gear 519 of the comparing differential 517. The intermediate 524 of the differential 520 drives the gear 386 of the azimuth Selsyn 405.

*Range correction.*—Referring to Figs. 11 and 14, the rack bar $133^{fr}$ for positioning the setter $125^{fr}$ to record the computed future range on the chain 502 meshes with and is shifted back and forth by a gear 525 on a shaft which is driven through gears 526 from the shaft 355 which, as previously described, is positioned angularly to indicator the future range as computed by the director. The control lugs $101^{fr}$ of the chain cars $100^{fr}$ thus positioned are carried to the sensing position 505 where they engage a shoe $198^{fr}$ and actuate switches $204^{fr}$ and $205^{fr}$ controlling the motor 527 of a follow-up unit 528 whose driven shaft 529 is connected to the rack bar $194^{fr}$ through gears 530 so as to impart the follow-up motion to the switches. In this way, the shaft 529 is positioned angularly to indicator the previously computed present value of the target range. This value is compared with the actual present value by a differential 531 having one terminal carried by the shaft and the other terminal carrying a gear 532 which is driven through gears 533 to the gear 166 on the present range indicator or shaft 21.

The intermediate 534 of the differential 531 will thus be positioned angularly in accordance with the difference between the computed and actual values of the present range. This correction is added to or subtracted from the motion transmitted from the future range indicator 355 to the time of flight cam 434. To this end, the intermediate gear 534 meshes with a gear 535 on one terminal member of a differential 536 having a gear 537 on its other terminal meshing with the last gear of the train 526 which is driven from the future range indicator or shaft 355. The intermediate gear 538 of the differential meshes with a gear 539 on the lower end of the shaft 420 which as previously described operates through the gearing 418 and 419 to turn the time of flight and quadrant elevation cams 434 and 407.

*Altitude correction.*—Referring now to Figs. 11 and 13, the rack bar $133^{fa}$ for positioning the future altitude setter $125^{fa}$ is actuated through gears 540 from the shaft or future altitude indicator 356. This coordinate is thus recorded at the position 504 on the control lugs $101^{fa}$ of the chain 503. The lugs are advanced to the sensing position 505 where they act on the shoe $198^{fa}$ of the reader $180^{fa}$ and actuate switches $204^{fa}$ and $205^{fa}$. These switches control the motor 541 of a follow-up unit 542 to drive a shaft 543 which through gears 544 drives the rack bar $194^{fa}$ to position the switches and produce the follow-up action. The shaft 543 thus indicators the computed value of present altitude. This is compared with the actual value then set up on the present altiude indicator 23. To this end, a differential 546 has one terminal member fast on the shaft 543 and the other terminal shaft 547 carrying a gear 548 which through a gear 549 is driven from the intermediate 23 of the differential gearing 61 which intermediate, as previously described, constitutes the present altitude indicator. The intermediate 550 of the differential 546 is of course moved in one direction or the other away from a neutral position in accordance with the differences between the computed and actual values of the present altitude, being disposed in such neutral position when these values coincide This will be the case when the target path is straight.

The altitude correction thus ascertained is added to or subtracted from the computed future altitude coordinate by means of a differential 551 one terminal of which carries a gear 552 meshing with the intermediate gear 550. The other terminal carries a gear 553 which through a gear 554 and the gear 540 is driven from the future altitude indicator 356. The intermediate gear 555 of the differential 551 meshes with the gear 430 which, as previously described, operates through the gears 426, 427, and 429 to drive the nut 424 by which the elevation and time of flight cams 407 and 434 are positioned axially.

It will be observed from the foregoing that the computed future coordinates are corrected continuously by the addition or subtraction of increments of the proper sense and proportional in magnitude to the deviation of target coordinates in the present target position from the future coordinates computed for the present target position at a time lagging the present by exactly the time of flight corresponding to the present target position. Of course, if the target is traveling in a straight line and at uniform speed, all three of the computed and actual values of the present coordinates will be equal and no correction will be made assuming of course that no mechanical or tracking errors are made. As a result, the computed future target position thus corrected should coincide with the actual future position so that a hit should be scored. However, the correction will not become exact until after the lapse of an interval equal to one and one-half times of flight, that is, one-half a time of flight to establish the future prediction and one time of flight to make the correction fully effective. Of course, where the curvature of the target path does not change uniformly, the correction will not compensate exactly for the deviation from a straight path. It will, however, effect a substantial increase in accuracy where the target deviation from a straight path remains of the same sense for the time necessary for the correction to become fully effective.

The mechanism also corrects for the systematic errors which creep in regularly due to inaccuracies inherent in the computer. Such correction is much more effective than is possible to obtain with so-called spotting controls.

I claim as my invention:

1. Apparatus for predicting the future position of a moving object having, in combination, a plurality of coordinate indicators, mechanism for setting the respective indicators in accordance with the changing coordinates of the object in its present position, a plurality of indicating members, means controlled by said indicators for computing the coordinates of a future object position and correspondingly positioning the respective members, means operable automatically to form mechanical records of the continuously changing positions of said members, feelers selectively moved in accordance with the changing contours of said records corresponding to the present time and positioned to sense the records at points thereon spaced from the points of recording a distance equal to the time interval between said present and computed future positions of said object, individual differentials having input members respectively positioned by said feelers and said indicators, and individual differentials each having one input element positioned by the output member of one of said first differentials and the other input element positioned by the corresponding one of said indicating members, and means controlled by the output elements of said second differentials to predict a corrected future position of said object.

2. In a director, the combination of mechanism continuously set in accordance with the present coordinates that locate a moving object and operable to compute the values of the coordinates for a future position of the object, means for recording the changing values of the computed future coordinates, means for reading the recorded values at points corresponding to the present time, differentials each having input members respectively positioned according to the actual present value and the computed present value of one of said coordinates, and a second plurality of differentials each having one input element positioned in accordance with one of said computed values of the future coordinate and its other input element positioned by the output member of the corresponding first differential, the output elements of said second differentials being positioned in accordance with the corrected values of the future coordinates.

3. Apparatus for predicting the future position of a moving object having, in combination, a plurality of coordinate indicators, mechanism for setting the respective indicators in accordance with the changing values of the coordinates of the object in its present position, means controlled by said indicators for computing the coordinates of a future object position, means operable automatically to form mechanical records of the changing values of said computed coordinates, feelers engageable with said records at points thereon spaced from the recording points by an interval equal to the time difference between the present and computed future positions of said object, said feelers being actuated in accordance with the changing contours of said records so as to be positioned in accordance with the recorded coordinate values corresponding to the present time, and means differentially combining the movements of said feelers and the corresponding indicators to determine the deviations of the actual from the computed coordinates of the present object position.

4. Apparatus for predicting the future position of a moving object having, in combination, a plurality of coordinate indicators, mechanism for setting the respective indicators in accordance with the changing values of the coordinates of the object in its present position, means controlled by said indicators for computing the coordinates of a future object position, means operable automatically to record mechanically the continuously changing values of said computed coordinates, feelers engageable with the respective records at points spaced from the recording points thereon corresponding to the present time whereby the individual feelers are positioned variably in accordance with the computed present values of said coordinates, means differentially combining the movements of said feelers and the corresponding indicators to determine the deviations of the actual from the computed coordinates of the present object position, and mechanism controlled by said computed coordinates and by said deviations and operable to predict a corrected future position of said object.

5. In an apparatus of the character described, the combination of means for computing the coordinates of the future position of an object moving in space, a traveling medium selectively variable in shape to form a mechanical record, a setter and a senser engageable with said medium at points spaced therealong, mechanism controlled by said means and actuating said setter in accordance with the changing values of one of said computed future coordinates, a movable member, mechanism controlled by said senser and operating to position the member in accordance with the changing values of the recorded coordinate, power driven means operating to drive said medium past said senser at constant speed, and power driven means operating to drive said medium past said setter at a selectively variable speed.

6. Apparatus of the character described having, in combination, a plurality of traveling mediums selectively variable in shape to form mechanical records, mechanism responsive to the changing values of the coordinates of the present position of a moving object and operable to compute the coordinates of a future position of the object assuming that the object travels in a straight path, means responsive to the changing values of said computed coordinates for recording the same on said mediums, means operable to read these records at points spaced beyond the recording points and corresponding to the present position of the target whereby to ascertain the present computed coordinates, and means for comparing the present computed coordinates with the corresponding ones of said first mentioned present coordinates to measure the differences therebetween and thereby determine the deviation of the target from its computed position.

7. In a predictor, means for measuring the present coordinates of a moving object, mechanism actuated in accordance with the changing values of the coordinates of the moving object and operable automatically to compute the coordinates of a future position of the object, mechanism actuated in accordance with the changing values of said computed coordinates and operable to indicate the values of the computed coordinates corresponding to the present time, means for comparing the instantaneous values of said present coordinates as determined by said measuring means with the respective computed coordinates predicted for the present instant and indicated by said second mechanism, and mechanism operable to add algebraically the differences thus determined between the actual and computed present coordinates to the values of the respective future coordinates then being computed by said first mentioned mechanism.

8. In a predictor, the combination of mechanism adapted to be adjusted in accordance with the changing present position of an object moving in space and continuously operable to predict the position of the object at a future time, means for measuring the deviation of the actual object position at the present time from the position computed by said mechanism for such time, and means correcting the current prediction in accordance with the sense and amount of said deviation.

9. In a predictor, mechanism for continuously computing the position of a moving object at a known future time, means for measuring the position of the object at the present time, mechanism actuated in accordance with the changing position of said object as determined by said computing mechanism and operable to determine the predicted position of the object corresponding to the present time, means operating continuously to compare the changing actual present position of the object with the predicted future position for a corresponding time whereby to determine the error in the previous prediction determined by said first mechanism, and means automatically actuated in accordance with the measured error and operable to correct subsequent predictions in accordance with the changing amounts of said error.

10. In a predictor, mechanism adapted to be adjusted in accordance with the changing present position of an object moving in space and continuously operable to predict the future positions of the object, means controlled by said mechanism and operable to determine the difference between the actual position of the object at a predetermined time and the predicted position made by said mechanism for a corresponding time, and means operable to modify a subsequent prediction in accordance with said difference.

11. In a director, the combination of mechanism adapted to be adjusted continuously in accordance with the present coordinates that locate a moving object and operable to compute the values of the coordinates for a future position of the object, means for measuring the values of the coordinates of the object in its present position, mechanism actuated in accordance with the changing computed values of said coordinates and operable to indicate the values of the computed coordinates corresponding to the present time, differentials each having input members respectively positioned according to the actual present value of one of said coordinates as determined by said first mechanism and the computed value of such coordinate as indicated by said second mechanism, and a second plurality of differentials each having one input element positioned in accordance with one of said computed values of the future coordinate and its other input element positioned by the output member of the corresponding first differential.

12. Apparatus of the character described having, in combination, a plurality of traveling mediums selectively variable in shape to form mechanical records, mechanism adjustable in accordance with the coordinates of an object moving in space and operable to compute the coordinates of a future position assuming that the object travels in a straight path, means for measuring the coordinates of the object in its present position, mechanism for sensing said records at points thereon corresponding to the present time whereby to determine the computed values of the object in its present position, and means operable at least at certain times to compare the computed coordinates corresponding to the present object position with the corresponding ones of said first mentioned present coordinates and thereby measure the differences therebetween whereby to determine the deviation of the object from its computed position.

13. The combination of mechanism adapted to be adjusted selectively in proportion to the changing present position of an object moving in space and operable to compute future positions of the object, means adjusted automatically in accordance with the present position of said object as set up in said mechanism, mechanism adjusted automatically in accordance with the position of said object as computed by said mechanism and operable to indicate the computed position of the object corresponding to the present time, and means for measuring the deviation of the computed present position from the actual present position.

DUNCAN J. STEWART.

REFERENCES CITED

The following references are of record in the file of this patent:

UNITED STATES PATENTS

| Number | Name | Date |
|---|---|---|
| 1,891,397 | Watson | Dec. 20, 1932 |
| 1,999,368 | Myers et al. | Apr. 30, 1935 |
| 2,065,303 | Chafee et al. | Dec. 22, 1936 |
| 2,235,826 | Chafee | Mar. 25, 1941 |